United States Patent [19]

Wolfe et al.

[11] Patent Number: 4,717,590
[45] Date of Patent: Jan. 5, 1988

[54] PROCESS FOR BINDING PIGMENT PARTICLES TO PHOSPHOR PARTICLES

[75] Inventors: Robert W. Wolfe, Wysox; Harry O. Schulze, Wyalusing, both of Pa.

[73] Assignee: GTE Products Corporation, Stamford, Conn.

[21] Appl. No.: 936,051

[22] Filed: Nov. 28, 1986

[51] Int. Cl.$^4$ ................................................ B05D 5/06
[52] U.S. Cl. ...................................... 427/68; 427/68; 427/201; 427/219; 427/372.2
[58] Field of Search .................... 427/71, 68, 201, 219, 427/372.2

[56] References Cited

U.S. PATENT DOCUMENTS

| | | | |
|---|---|---|---|
| 4,287,229 | 9/1981 | Watanabe et al. | 427/68 |
| 4,473,634 | 9/1984 | Dodas et al. | 427/68 |
| 4,624,861 | 11/1986 | Ugle et al. | 427/68 |

Primary Examiner—Janyce A. Bell
Attorney, Agent, or Firm—Donald R. Castle; L. Rita Quatrini

[57] ABSTRACT

A process is disclosed for bonding pigment particles to phosphor particles. The process involves forming a relatively uniform blend of a phosphor, one or more pigments, colloidal silicon dioxide, and water, with the amount of water in the blend being no greater than about 10% by weight, and heating the blend at a temperature of at least about 150° C. to produce a pigmented phosphor having an overcoating of silicon dioxide.

5 Claims, No Drawings

PROCESS FOR BINDING PIGMENT PARTICLES TO PHOSPHOR PARTICLES

This invention relates to a process for binding pigment particles to phosphor particles by contacting phosphor particles and pigment particles with a colloidal silicon dioxide by blending the materials in an essentially dry state, followed by heating.

BACKGROUND OF THE INVENTION

Methods of binding pigment particles to phosphor particles are described in the literature. These materials are mostly used in cathode ray tubes where the pigment acts as a filter to improve the color purity and contrast of the emitted light. Both organic and inorganic pigment binders are used in industry. In U.S. Pat. No. 3,875,449, issued Apr. 1, 1975 phosphor particles are surrounded by a continuous coating of such a material, and the coated particles are then encapsulated in a protective resin coating, for example polyvinyl alcohol. In U.S. Pat. No. 3,886,394, issued May 27, 1975, phosphor particles are covered with a filter material adhered to the surface of the particles by a gelatin layer, for example, polyvinyl pyrrolidone. The filter particles are thus embedded or dispersed in the adherent gelatin layer. In U.S. Pat. Nos. 4,020,231, and 4,128,674, issued Apr. 26, 1977, and Dec. 5, 1978, respectively, and assigned to the present assignee, a light modifying layer is formed on the phosphor by coprecipitation of silica and pigment particles. In U.S. Pat. No. 4,021,588, issued May 3, 1977, a filter material is precipitated directly onto the phosphor particles and the particles are then sintered to adhere filter particles to the surfaces thereof. U.S. Pat. No. 4,049,845 issued Sept. 20, 1977, describes various organic binder systems that may be used. These are usually applied as lattices.

With the exceptions of U.S. Pat. Nos. 4,020,231 and 4,021,588, the above patents all describe organic-based coating systems. The major disadvantage of these systems is that the phosphor particles must retain their organic coating in order to retain the light modifying particles. Thus, the strong oxidizing agents and/or heat normally encountered during phosphor reclaim operations (in which a phosphor is reclaimed from the faceplate of a cathode ray tube) must be avoided. This requirement essentially renders such reclaim operations impractical, since organic-based systems are also used to adhere the coated phosphor particles to the faceplate. In practice then, pigment or other light modifying particles are then removed during the reclaim operation and the reclaimed phosphor particles are then recoated prior to being redeposited on a faceplate.

Another disadvantage of organic-based coatings is that they tend to render coated particles unwettable by water based slurry systems used to form cathode ray tube screens. Such poor wettability leads to poor dispersion of the phosphor particles and consequent poor screen quality.

Other coating techniques which avoid the use of organic materials have proved unsatisfactory for other reasons. For example, the coprecipitated coating of U.S. Pat. Nos. 4,020,231 and 4,128,674 tend to have poor adherence when subjected to the handling associated with screening operations. The sintered coating of U.S. Pat. No. 4,021,588, while exhibiting good adherence, requires relatively high temperatures (at least about 800° C.) for its formation.

U.S. Pat. No. 4,473,634 describes an inorganic binder system which uses water glass (potassium silicate) as the binder. However, the drawbacks in this process are that the waterglass binder is slurried with the phosphor and pigment and then dried into a hard mass which must be ground back into a fine powder. The grinding process is labor intensive and results in poor material efficiency due to large amounts of undersize particles resulting from the grinding process.

SUMMARY OF THE INVENTION

In accordance with one aspect of this invention, there is provided a process for bonding pigment particles to phosphor particles. The process involves forming a relatively uniform blend of a phosphor, one or more pigments, colloidal silicon dioxide, and water, with the amount of water in the blend being no greater than about 10% by weight, and heating the blend at a temperature of at least about 150° C. to produce a pigmented phosphor having an overcoating of silicon dioxide.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

By the process of this invention, a pigmented coated phosphor is produced by bonding phosphor particles and pigment particles by first forming a relatively uniform blend of phosphor, one or more pigments, colloidal silicon dioxide and water with the amount of water being no greater than about 10% by weight of the resulting blend. The blend is then heated to drive off the water and form the pigmented phosphor having an overcoating of silicon dioxide.

The pigmented coated phsophor of this invention remains a powder that is easily processed as opposed to the coated phosphor of U.S. Pat. No. 4,473,634 which is a hard mass that must be subjected to intensive grinding operations to render it usable in cathode ray tube applications.

The phosphor particles may be any phosphor material suitable for use in cathode ray tube applications, that is, any phosphor which upon excitation by cathode rays emits radiation of a wave length suitable for the envisioned application. It is of course comtemplated in accordance with a preferred embodiment of the invention, that the phosphor particles be chosen for the standard red and blue phosphors known to be suitable in the fabrication of color cathode ray tube screens for color television.

The light modifying material or pigment particles can be any such materials used in the art. Some examples of light modifying materials are iron oxide red pigment, and cobalt aluminate blue pigment.

Some examples of phosphor and pigments that can be successfully bonded by the present invention are ZnS:Ag, blue emitting phosphor, with cobalt aluminate blue pigment, and $Y_2O_3$:Eu and $Y_2O_3$S:Eu, red emitting phosphors with iron oxide red pigment.

In general, the average particle size of the phosphors is in the range of from about 4 to about 12 micrometers and the pigment particles are less than about 1 micrometer.

The preferred source of colloidal silicon dioxide is supplied by Dupont Corporation under the name of "Ludox". The colloidal silicon dioxide is supplied typically as a water-based dispersion, with about 0.36 g of silicon dioxide per milliliter of dispersion.

The relative amounts of phosphor particles and pigment particles are conventional amounts used in the art such as are described in U.S. Pat. No. 4,473,634.

Instead of an aqueous suspension being formed of these components as described in U.S. Pat. No. 4,473,634, a blend is formed of phosphor, one or more pigments, colloidal silicon dioxide, and water in which the water component makes up no greater than about 10% and preferably from about 2.5% to about 5% by weight of the blend. Therefore, the components are considered to be essentially in the dry state. The components can be blended by any method known in the art. A preferred blending technique will be given in the Example that follows.

The blend is then heated at a temperature of at least about 150° C. to remove chemically bound water. The preferred temperatures are from about 150° C. to about 600° C. with from about 200° C. to about 450° C. being especially preferred to accomplish the removal of chemically bound water.

According to a preferred method of practicing the invention, the blend is first heated to remove free water prior to the heating step to remove the chemically bound water. The preferred heating temperatures for removing the free water are from about 120° C. to about 180° C.

The $SiO_2$ content of the coated pigmented phosphor is from about 0.1% to about 1.5% by weight.

As a result of this operation, an overcoating of silicon dioxide is formed on the pigmented phosphor and there results a well-bonded pigment to phosphor particle with minimum agglomeration of phosphor particles. This is an improvement over the prior art in which a hard mass results from the removal of the chemically bound water. Pigmented coated phosphors produced by the process of this invention are fine grain materials with good pigment retention throughout the cathode ray tube coating process. As a result there are less product rejections due to phosphor screening irregularities than there are with prior art materials.

Before the colloidal $SiO_2$ overcoating is applied, the pigment can be first applied to the phosphor by several pigmenting methods known to the art. Some methods are as follows:

1. Slurrying the pigment and phosphor and then adding a very small amount of positively charged silicon dioxide such as supplied by Wessolite Corporation under the trade name of Wessol "P". Typical amounts of this silicon dioxide are from about 0.05% to about 0.15% by weight of the total amount of phosphor, pigment, and silicon dioxide. The addition of silicon dioxide at this point serves to aid in intimately mixing the phosphor and pigment. This is a separate and distinct step from the addition of colloidal silicon dioxide in the subsequent processing and is not to be confused with it, because the amount of silicon dioxide which is added at this point is sufficient to weakly bond the pigment to the phosphor particles but is not sufficient to bind the pigment particles strongly enough to the phosphor particles for use in the screening process. The slurry is agitated for about 15 minutes and then filtered and dried. It is then processed according to the present invention.

2. For some systems electrostatic attraction of the pigment particles to the phosphor particles is sufficient to bind pigment and phosphor particles preliminary to applying the colloidal silicon dioxide overcoat.

3. Using a latex binder to bind the phosphor and pigment particles sufficiently for the colloidal silicon dioxide overcoating step.

In methods 1 through 3, the phosphor is dried at about 120° C. and then can be used as the pigmented phosphor to be overcoated with silicon dioxide according to the process of this invention.

4. Another method of pigmenting can be accomplished by dry admixing pigment and phosphor. However, a wet method is preferred to provide an optimum blend of phosphor and pigment particles prior to applying the silicon dioxide overcoat.

To more fully illustrate this invention, the following nonlimiting example is presented.

EXAMPLE

About 6 kilograms of ZnS:Ag blue emitting cathode ray phosphor pigmented with about 1.5% by weight $CoAl_2O_4$ blue pigment via Method 1 described above, is loaded into an eight quart V-blender with liquids-solids capability and high speed intensifier bar system. The pigment has been previously applied with about 0.15% by weight of silicon dioxide supplied in the form of Wessol "P" colloidal silicon dioxide, and then dried. With the blender and high speed intensifier operating, about 0.25% by weight of colloidal $SiO_2$ supplied by Dupont under the trade name of "Ludox" which has been diluted to about 150 ml (2–½% liquid by weight) is fed into the blender. The blender is operated for about 10 minutes and the powder is unloaded. Since the powder contains only about 2½% liquid, it is still relatively free flowing and easily handled. The phosphor is then dried at about 120° C. for about 2 hours and heated or annealed at about 400° C. for about 2 hours to condense the $SiO_2$. The colloidal silicon dioxide forms an overcoat over the phosphor and pigment particles and serves to bind them together. The phosphor is then cooled, lightly wet milled to break up agglomerates, wet screened and dried. The phosphor is then ready for shipment. Alternately, the phosphor can be dry screened through 400 mesh ASTM and blended before shipment. The phosphor of this example is compared with the same type of phosphor prepared by the method of U.S. Pat. No. 4,473,634 using potassium silicate as the source of silicon dioxide.

The following table gives coulter counter particle size data for the coated phosphor of this invention and for the coated phospor produced by the method of U.S. Pat. No. 4,473,634.

| DESCRIPTION | COULTER COUNTER PARTICLE SIZE DATA | | | | CUSTOMER* SCRAP LEVEL |
|---|---|---|---|---|---|
| | 50% SIZE | Q.D. | >15 μm | <5 μm | |
| Phosphor of Example 1 | 11.2 μm | 0.24 | 17.8 | 4.6 | 1% |
| U.S. Pat. No. 4,473,634 | 9.6 μm | 0.34 | 16.2 | 9.1 | 2% |

*The above phosphors were tested by a maker of color television tubes. The scrap level reported is the percentage of cathode ray tube faceplates that are defective due to imperfections in the phosphor coating.

The phosphor of this invention has about 50% fewer screening rejects due to the phosphor (scrap level column). It is believed that the better performance of the phosphor of this invention is due in large part to the narrower particle size distribution of phosphors of this invention as opposed to phosphors of the above named patent resulting in fewer undersize (<about 5 micrometers) particles. Excessive amounts of small particles are known to present difficulties in the television tube fabrication process. The particle size distribution parameter, Q.D. is a measure of the width of the number of particles versus size curve. The smaller the Q.D., the narrower is the Gaussian-shaped particle size distribution curve.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for bonding pigment particles to phosphor particles, said process comprising:
    (a) forming a relatively uniform blend of a phosphor, one or more pigments, colloidal silicon dioxide, and water, with the amount of water in said blend being no greater than about 10% by weight of said blend; and
    (b) heating said blend at a temperature of at least about 150° C. to produce a pigmented phosphor having an overcoating of silicon dioxide.

2. A process of claim 1 wherein the content of said colloidal silicon dioxide is from about 0.1% to about 1.5% by weight of the overcoated pigmented phosphor.

3. A process of claim 1 wherein the amount of water in said blend is from about 2.5% to about 5% by weight of said blend.

4. A process of claim 1 wherein the temperature is from about 150° C. to about 600° C.

5. A process of claim 4 wherein the temperature is from about 200° C. to about 450° C.

* * * * *